Sept. 11, 1945.  R. J. WISE  2,384,515
SIGNAL RECORDING APPARATUS
Filed Jan. 13, 1943  2 Sheets-Sheet 1
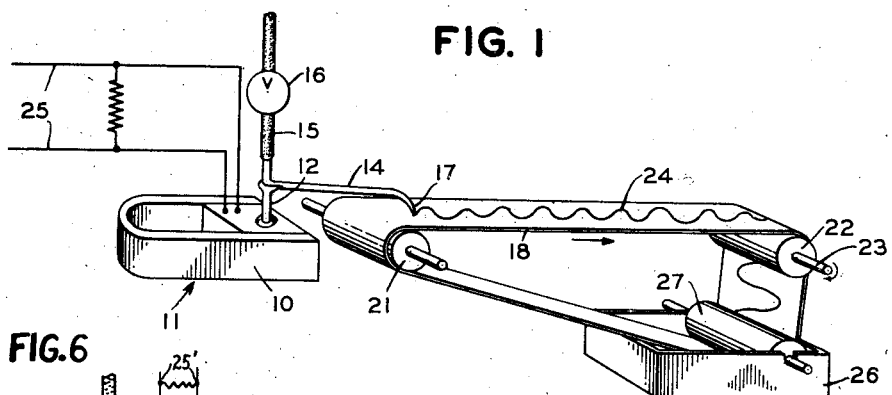
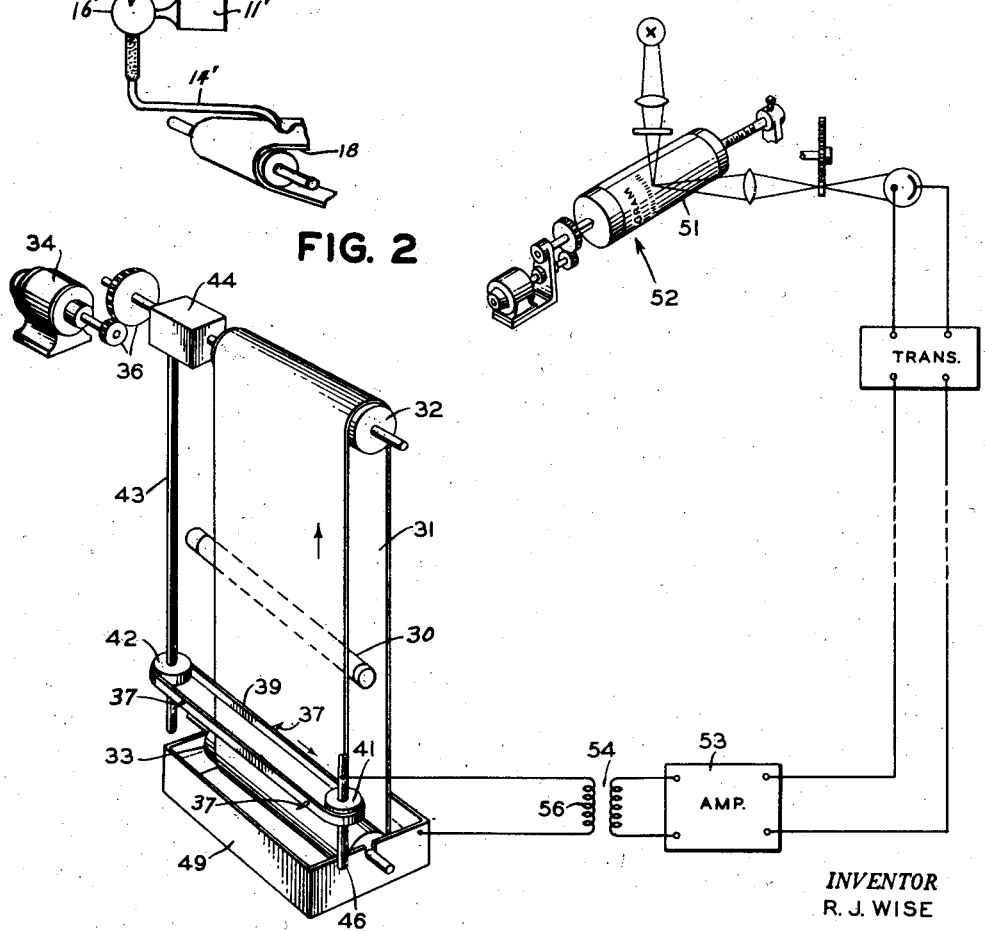
INVENTOR
R. J. WISE
BY
M. J. Reynolds
ATTORNEY Sept. 11, 1945. R. J. WISE 2,384,515
SIGNAL RECORDING APPARATUS
Filed Jan. 13, 1943 2 Sheets-Sheet 2
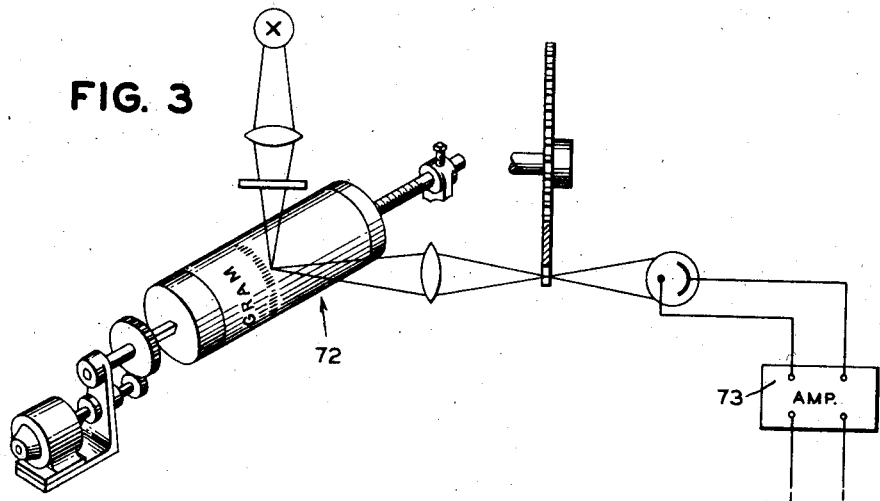
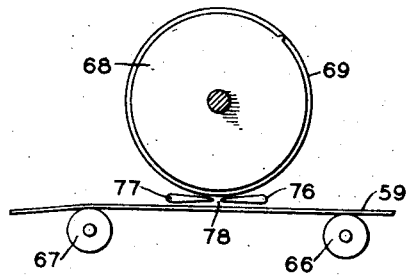
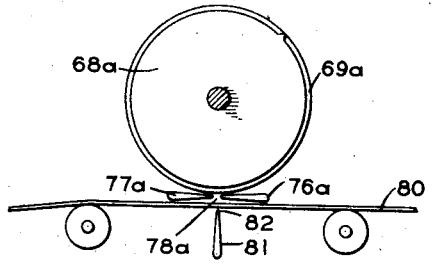
INVENTOR
R. J. WISE
BY
M. J. Reynolds
ATTORNEY Patented Sept. 11, 1945

2,384,515

UNITED STATES PATENT OFFICE 2,384,515

SIGNAL RECORDING APPARATUS

Raleigh J. Wise, Dunellen, N. J., assignor to The Western Union Telegraph Company, New York, N. Y., a corporation of New York Application January 13, 1943, Serial No. 472,210

9 Claims. (Cl. 234—1)

The present invention relates to recording and more particularly to the recording of electrical signals, such as meter readings, facsimile signals, and the like, upon a moving web.

One of the objects of the present invention is to provide a recorder employing a recording medium upon which the signals may be alternately recorded and effaced, whereby the recording medium may be used continuously over a long period of time.

Another object is to provide a novel recording medium capable of being marked in a distinctive manner and of being readily restored to its original or unmarked condition.

Still another object is to provide suitable recording apparatus for applying marking condition to said recording medium.

Other objects and advantages will hereinafter appear.

In accordance with the present invention I provide a recording medium in the form of a reticulated or perforated web having small closely spaced interstices capable of sustaining a film of a liquid thereacross and I selectively remove such liquid from said interstices in elemental areas of the medium to define the marking areas of the recording medium. The film forming liquid may be colored in order that a distinctive pattern may be formed on the medium by the selective removal of the liquid therefrom. This removal may be effected mechanically, as by an air blast, or electrically, as by a suitable electrically charged stylus disposed adjacent to the surface thereof and having movement relative thereto.

The invention will be best understood by reference to the accompanying drawings, in which—

Fig. 1 shows the present invention embodied in a recording meter;

Fig. 2 is a somewhat diagrammatic showing in perspective of a recorder for facsimile telegraph signals;

Fig. 3 shows a modified form of facsimile recorder embodying the present invention and associated with a facsimile telegraph transmitter.

Fig. 4 is a fragmentary vertical section taken on line 4—4 and illustrates details of the recorder of Fig. 3;

Fig. 5 is a view similar to Fig. 4 of a further modification; and

Fig. 6 shows a modification of the arrangement of Fig. 1 employing a stationary marking element.

Referring to the drawings, and at present to Fig. 1 thereof, reference character 10 represents the stationary portion of a measuring instrument such as an ammeter, voltmeter or the like, referred to hereinafter in its entirety by the reference numeral 11. The moving system of the measuring instrument or meter 11 is connected in the usual manner to impart rotation to a shaft 12 which ordinarily supports an indicator such as a needle or the like. A tube 14 is secured to the shaft 12 and is in communication with a flexibly connected conduit 15 which is supplied with air or other fluid under pressure so that when a valve 16 in the conduit 15 is opened, air will be projected in the form of a jet from the nozzle end 17.

The recording web 18 is in the form of a fine mesh screen made of woven wire, of pierced metal or of cloth. Ordinary commercial wire screening is suitable which has 80 to 400 holes to the inch. Another type of commercially available metal screen similar to the reticulated screen described above is known as "Lectro-Mesh" and consists of a metal sheet perforated with numerous holes. The advantage of this latter type of web is that it presents a flat surface, whereas, the reticulated web is rough by reason of the interweaving of the strands composing it. Both types, however, are suitable for practicing the invention. Rayon and cotton cloths having approximately 50 threads per inch have also been tested and found to be satisfactory for the purpose of this invention.

The web 18 in Fig. 1 is in the form of an endless belt which passes over and is supported by an idler roller 21 and a roller 22 which is rotated in the direction of the arrow through its supporting and driving shaft 23 in any suitable manner. The speed of rotation will in general be determined by the character of the trace 24 drawn by the nozzle 17 as the tube 14 swings in response to changes in an electrical characteristic under observation, supplied by the electrical circuit indicated by the reference character 25.

A receptacle 26 supports an additional idler roller 27 over which the web is passed so that it is moved continuously through a bath of liquid contained in the receptacle 26. The liquid of the bath completely fills all of the interstices of the web 18 and may be plain or soapy water. The water may be colored in order to improve the contrast between the record, represented by unfilled interstices and the background, represented by the filled interstices. Oil, clear or colored, may also be used.

In operation of the recorder just described the liquid in the receptacle 26 has the property of readily adhering to and forming a film within the openings of the screen wire mesh cloth or perforated material forming the web. The films formed within the openings, although quite stable, are easily removed. Air issuing in a jet from the nozzle 17 removes the fluid from each opening that it passes over and portions where the fluid has been removed by the jet contrast well with the background formed by the mesh containing the undistributed fluid. The record so obtained may be projected upon a screen with good contrast by means of any suitable tape projector, such as that shown in the patent to Dirkes No. 1,684,309, granted September 11, 1928. This record also is visible and can be inspected throughout the distance between the rollers 21 and 22.

For the recording of make and break signals, such as a telegraph code, a stationary air jet 14' may be employed in conjunction with the moving web 18, the air valve 16' of the jet being opened and closed by an electromagnet 11', as shown in Fig. 6, in accordance with the make and break signals. With the arrangement described in the preceding paragraphs, the air jet may be moved transversely of the continuously moving web 18 to scan the web in successive lines while the valve 16 is being operated in accordance with signals derived by scanning a line of a picture or other piece of subject matter. A picture in facsimile of the scanned subject matter may be built up by recording these lines side by side in the manner usual when obtaining a record by the facsimile process.

Fig. 2 of the drawings shows a recorder in which the electrical effect of a current or voltage is employed selectively to remove liquid films from successive adjacent interstices of a moving film or web. The recorder comprises a web 31 which is similar to the web 18 described above in connection with Fig. 1 of the drawings. However, the web 31 is preferably of non-conducting material such as cloth or it may be a metal screen of either type described above the metal body of which is coated with insulating enamel or lacquer leaving the interstices free of the coating matter. The web 31 passes over a driving roller 32 and an idler roller 33. The former is driven by a motor 34 through the usual speed reducing gear 36 so that the linear speed of the screen is comparable to the speeds employed in facsimile recorders heretofore known. Reference character 37 indicates a plurality of scanning styluses supported by a movable belt 39 passing over an idler pulley 41 and a driving pulley 42. The pulley 42 is driven by a shaft 43 and a reduction gear 44 at a speed properly correlated with the linear speed of the web 31 so that successive line scanning is obtained. Any other means of driving the pulley 42 and moving the styluses 37 on the belt at a suitable scanning speed may be employed. In the arrangement shown the belt 39 as well as the pulley 41 and its shaft 46 are of conductive material although other means for connecting the styluses to the signal source may be employed. The lower loop of the web 31, where it passes over the roller 33, is immersed in a bath of liquid contained in a trough or receptacle 49. This liquid is conductive and may be of acidulated or salted water, and it may be colored with a dye if desired. The facsimile signals obtained from the scanner 51 of a facsimile transmitter 52 are applied after transmission and amplification by the amplifier 53 to an output transformer 54. One terminal of the secondary 56 of this transformer is connected to the shaft 46 and the other is connected to the trough 49 if it is formed of metal or it may be connected to an electrode immersed in the liquid of the trough. In this manner facsimile signals originating at the transmitter 52, after suitable amplification, are impressed between the stylus points, which are maintained out of contact with the web 31, and the films of conducting liquid in the interstices of the web. Sparks will jump through a small air gap to the web 31 during the stylus travel in one direction. A record representing the subject matter scanned in the transmitter will appear above the stylus holding belt 39 when the web 31 is continuously fed in the direction of the arrow by the pulley 32.

A source of illumination 30 may be placed behind the web 31 to give the necessary contrast to the recorded image or for the purpose of projecting the image onto a screen. The recorder as shown in Fig. 2 may be made on a large scale for the purpose of displaying bulletins.

Fig. 3 of the drawings shows a modified recorder employing the well known helical scanner in place of the moving styluses of Fig. 2. A liquid containing receptacle or trough 58 is provided for immersing a continuous recording web 59 as it is passed through the liquid bath in the receptacle. A series of guiding rollers 61 to 64 guide the web downwardly into the trough and upwardly out of the trough from which it passes over the guide rollers 66 and 67 located on each side of a scanning roller 68. The web does not come into contact with the helical scanning projection 69 on the scanning roller 68. It will be drawn forwardly in the direction of the arrow by any suitable takeup mechanism which is driven at a speed correlated with the scanning roller 68, so as to place the scanning lines on the recording web substantially without distortion. Facsimile signals originating at a facsimile transmitter 72 are amplified in the amplifiers 73 and 74 and applied between the roller 68 and the web 59, the interstices of which are filled with conducting liquid contained in the trough 58.

Two strips or sheets 76 and 77 of insulating material, for example mica, are positioned between the roller 68 and the adjacent surface of the recording web 59. The edges of these sheets are spaced apart to provide a narrow slot 78 through which an electric field applied by the helix 69 of the roller 68 may affect the moving recording web 59. The slot 78 should be as narrow as possible and in practice it will be about one one-hundredth of an inch wide. If desired, a single slotted sheet may replace the sheets 76 and 77. When two sheets are employed, the width of the slot 78 is adjustable.

In operation of the modified recorder described, signals represented by voltage changes impressed between the conducting liquid in the interstices of the web and the helical projection 69 on the roller 68 act upon this liquid to remove it. Therefore, when a marking signal is present, representing a mark on the original transmitter 72, liquid will be removed and as a result of continuous operation, an image representing the original subject matter scanned at the transmitter will be recorded on the web 59. This image may be viewed directly by reflected light or by illuminating the web from its reverse side, or it may be projected upon a screen as described in connection with Fig. 2. The system may be arranged so that removal of the liquid film will occur when dark portions of the original or the background of the original is being scanned.

Ordinarily, the film will be removed from the interstices when the lighter background of the original is being scanned, in which case no inverter will be necessary at the transmitter or at the recorder. The same is true of the recorder of Fig. 2.

Fig. 5 of the drawings shows a recorder similar to that disclosed in Fig. 4 of the drawings with a conductive platen 81 added, which is spaced from the recording web 80 opposite the slot 78a between the insulating sheets 76a and 77a. The web 80 may be of an endless belt similar to the web 31 of Fig. 2, or it may be in the form of a long strip which is drawn from a storage roll.

The output of the recorder amplifier is applied between helical projection 68a and the sharpened edge 82 of the platen 81. In operation of the modified recorder of Fig. 5, a liquid having proper characteristics may be employed whether or not it is an electrical conductor and it is preferably non-conducting. The liquid used may possess the property of solidifying either by evaporation, leaving a residue in the interstices, or by the entire liquid itself changing into the solid phase in the interstices of the web thereby providing a permanent record of the recording in either case. When a permanent record is obtained, the web 80 may be rolled by the machine at a point beyond the scanning roller 68a.

The nature of the invention will be determined from the foregoing and the scope determined by the appended claims.

What is claimed is:

1. In a recorder, a record receiving member comprising a reticulated web containing in the interstices thereof a substantially uniformly dispersed visible liquid, means to remove said liquid from said interstices over selected areas of said member, and electrically responsive means to cause selective operation of said liquid removing means.

2. In a recorder, a record receiving member comprising a reticulated web containing a substantially uniformly dispersed visible liquid, fluid jet projecting means to remove said liquid from said interstices over selected areas of said member, and electrically responsive means to cause selective operation of said fluid projecting means.

3. In a recorder, a record receiving member comprising a reticulated web containing a substantially uniformly dispersed visible liquid, means to project a fluid stream of predetermined area in cross section on said member to remove liquid from said interstices over a portion of the surface of said member, and means to produce relative movement between said stream projecting means and said member, whereby to produce a visible trace on said member of said movement.

4. In a recorder, a record receiving member comprising a reticulated web containing a substantially uniformly dispersed visible electrically conducting liquid, means to effect a point by point scanning of said member by an electrical scanning device and means for applying an electrical potential to said scanning device during said scanning operation to remove liquid from successive portions of said member whereby to produce a visible record on said member of the electrical potential applied to said scanning device.

5. A facsimile recorder comprising a movable perforated web arranged to provide a recording zone and a record display area, means for conditioning said web to receive a record including means for supplying a liquid to the perforations in said web prior to its passage through said recording zone, and means controlled by electrical variations for recording in said recording zone by removing liquid from selected perforations, said conditioning means also serving to obliterate the record previously applied to said web in said recording zone.

6. A facsimile recorder comprising a web of insulating material provided with closely spaced perforations, means for filling said perforations with an electrically conducting liquid film, scanning means for traversing said web repeatedly along closely spaced substantially parallel lines, and means for applying an electric field between the liquid films in said web and said scanning means.

7. In an electrical recorder, a rotating member having a helical scanning projection, a movable electrically sensitive reticulated record receiving web supported and guided for movement adjacent to but out of contact with said rotating member, means for dispersing a visible liquid in the interstices of said web an insulating barrier provided with a slot interposed between said web and said rotating member, and means to impress an electrical potential between said helical projection and said web whereby to effect a discharge between said projection and elemental areas of said web to selectively remove said liquid therefrom.

8. A facsimile recorder comprising a web provided with closely spaced perforations, means for filling said perforations with a liquid film, scanning means for traversing said web repeatedly along closely spaced substantially parallel lines, a scanning electrode opposite said scanning means, and means for applying electrical facsimile signals between said electrode and said scanning means.

9. In a facsimile recorder, a rotating member having a helical scanning projection, a movable record receiving electrically sensitive web supported and guided for movement adjacent said rotating member, an insulating barrier provided with a narrow slot interposed between said web and said member and means to impress a signaling potential representing scanned subject matter between said helical projection and said web.

RALEIGH J. WISE.